Patented May 6, 1947

2,420,250

UNITED STATES PATENT OFFICE 2,420,250

METHOD OF PREPARING GAMMA-VALEROLACTONE

Lucas P. Kyrides, Webster Groves, and Ferdinand B. Zienty, St. Louis, Mo., assignors to Monsanto Chemical Company, St. Louis, Mo., a corporation of Delaware No Drawing. Application September 8, 1944, Serial No. 553,288

9 Claims. (Cl. 260—344)

This invention relates to the preparation of lactones and particularly to a method of preparing gamma-valerolactone from 1,4-pentanediol.

The dehydrogenation of glycerol by heat treatment in the presence of copper chromite results in the formation of hydroxy-propanone (acetol). Likewise, the dehydrogenation of 1,3-butylene glycol by heat treatment in the presence of basic copper carbonate results in the formation of acetoethanol. Consequently, the dehydrogenation of 1,4-pentanediol by heat treatment in the presence of copper chromite would be expected by analogy to form gamma-acetopropanol. We have discovered, however, that this process yields only minute quantities of gamma-acetopropanol.

The object of our invention is to provide a novel process for the preparation of gamma-valerolactone.

Other objects will become apparent from the following specification and examples.

The process of the present invention, generally stated, comprises heating 1,4-pentanediol with a copper chromite catalyst, for example, under reflux conditions, until the evolution of hydrogen ceases. The resulting reaction mixture is then distilled, for example, under reduced pressure, to recover the gamma-valerolactone.

The copper chromite catalyst used in the process of the present invention may be prepared in the usual manner for a catalyst of this type for hydrogenation and dehydrogenation purposes. A suitable method has been found to be that described by Calingaert and Edgar in the Journal of Industrial and Engineering Chemistry, vol. 26, pages 878–9, 1934. Briefly, this process comprises dissolving 250 g. moles of copper sulfate pentahydrate and 125 g. moles of sodium dichromate dihydrate in 300 l. of water, slowly adding 28% ammonia until no further precipitation occurs in the mother liquor, filtering the resulting slurry, washing the filter cake with water until free from water-soluble salts, air drying the cake and oven drying at 110° C. The dried cake is broken up into friable lumps and mixed with sufficient water to form a coherent mass when squeezed in the hand. The mass is then passed through a 12-mesh screen to form granules which are then roasted at 320 to 340° C. until the material is lustrous black in color and appearance, with a faint brownish cast. The material is then pulverized and screened through a 200-mesh screen. The resulting material may then be used as the catalyst in the aforescribed process. Other methods of preparing the copper chromite catalyst may be employed, the criterion being the preparation of a catalyst having a suitable degree of activity for dehydrogenation reactions.

As an alternative embodiment of the present invention, the copper chromite catalyst may be used in the presence of small quantities of an alkaline substance such as sodium hydroxide, potassium hydroxide, barium hydroxide, calcium oxide, or sodium carbonate in the reaction mixture. The quantity of alkaline substance may vary from that which is just sufficient to render the reaction mixture alkaline to somewhat larger quantities. The amount of alkaline substance is apparently not critical. Likewise, as a further alternative embodiment, small amounts of other substances such as decolorizing charcoal or Alundum may be incorporated in the reaction mixture, either together with the alkaline material or without the alkaline material. The presence of sodium hydroxide or decolorizing charcoal as promoter in the reaction mixture tends to increase the yield of gamma-valerolactone. Yields of gamma-valerolactone by the process of this invention range from 80 to 90% or more when the copper chromite catalyst alone is employed. In the presence of sodium hydroxide or decolorizing charcoal, the yields tend to be nearer the upper limit of that range.

The following examples will serve to illustrate the process of the present invention. These examples are merely illustrative and are not to be construed as limiting the scope of the invention.

Example I

A mixture of 42 g. of 1,4-pentanediol and 1 g. of copper chromite catalyst was stirred and refluxed until the evolution of hydrogen had ceased. The product was distilled under reduced pressure directly from the catatlyst. A yield of 28 g. (79%) of gamma-valerolactone was obtained. The recovered, unreacted 1,4-pentanediol weighed 6.4 g. Only traces of gamma-acetopropanol were found. Measurement of the volume of hydrogen produced in this reaction disclosed that two molecules of hydrogen were evolved for each molecule of 1,4-pentanediol employed.

Example II

A mixture of 20 g. of 1,4-pentanediol and 1 g. of copper chromite catalyst was placed in a flask equipped with a stirrer and a condenser. The reaction mixture was stirred and heated. At 200° C. a lively evolution of hydrogen occurred. Shortly thereafter the temperature of the reaction mixture dropped to 190 to 192° C., and dehydrogenation proceeded smoothly as evidenced by the continued evolution of hydrogen. A small amount of water was distilled out, but very little of the reaction mixture came over. The evolution of hydrogen ceased in about one hour. The product was distilled under reduced pressure from the catalyst and 16.0 g. (80%) of gamma-valerolactone were obtained.

*Example III*

A mixture of 104 g. of 1,4-pentanediol, 4 g. of copper chromite catalyst and 0.15 g. of reagent sodium hydroxide was stirred vigorously and heated under reflux. The evolution of hydrogen had practically ceased in about three hours. The reaction mixture was cooled to about 30° C., filtered from the catalyst and distilled under reduced pressure. The yield of gamma-valerolactone was 79 g., equivalent to 87% yield based on the 1,4-pentanediol consumed. 12 g. of unreacted 1,4-pentanediol were recovered.

*Example IV*

The method of Example III was repeated, using 1 g. of Alundum in place of sodium hydroxide. The yield of gamma-valerolactone obtained was 82%.

*Example V*

The method of Example III was repeated, using 1 g. of decolorizing charcoal in place of sodium hydroxide. The yield of gamma-valerolactone obtained was 90%.

*Example VI*

The method of Example III was repeated, using 1 g. of potassium hydroxide in place of sodium hydroxide. The yield of gamma-valerolactone was 91%.

We claim:

1. The method of preparing gamma-valerolactone comprising heating 1,4-pentanediol in the presence of a catalyst comprising copper chromite until evolution of hydrogen has ceased, and subsequently recovering gamma-valerolactone from the reaction mixture.

2. The method of preparing gamma-valerolactone comprising heating 1,4-pentanediol in the presence of copper chromite catalyst and decolorizing charcoal until evolution of hydrogen has ceased and subsequently recovering gamma-valerolactone from the reaction mixture.

3. The method of preparing gamma-valerolactone comprising heating 1,4-pentanediol in the presence of copper chromite catalyst and an alkaline agent selected from the group consisting of potassium and sodium hydroxides and carbonates, calcium oxide and barium hydroxide, until evolution of hydrogen has ceased and subsequently recovering gamma-valerolactone from the reaction mixture.

4. The method of preparing gamma-valerolactone comprising heating 1,4-pentanediol in the presence of copper chromite catalyst and sodium hydroxide until evolution of hydrogen has ceased and subsequently recovering gamma-valerolactone from the reaction mixture.

5. The method of preparing gamma-valerolactone comprising heating 1,4-pentanediol in the presence of copper chromite catalyst and Alundum until evolution of hydrogen has ceased and subsequently recovering gamma-valerolactone from the reaction mixture.

6. The method of preparing gamma-valerolactone comprising heating 1,4-pentanediol in the presence of a catalyst comprising copper chromite under reflux conditions until evolution of hydrogen has ceased, and subsequently distilling gamma-valerolactone from the reaction mixture under reduced pressure.

7. The method of preparing gamma-valerolactone comprising heating 1,4-pentanediol in the presence of a catalyst comprising copper chromite under reflux conditions until evolution of hydrogen has ceased, and subsequently distilling gamma-valerolactone from the reaction mixture under reduced pressure.

8. The method of preparing gamma-valerolactone comprising heating 1,4-pentanediol in the presence of copper chromite catalyst and decolorizing charcoal under reflux conditions until evolution of hydrogen has ceased, and subsequently distilling gamma-valerolactone from the reaction mixture under reduced pressure.

9. The method of preparing gamma-valerolactone comprising heating 1,4-pentanediol in the presence of copper chromite catalyst and sodium hydroxide under reflux conditions until evolution of hydrogen has ceased, and subsequently distilling gamma-valerolactone from the reaction mixture under reduced pressure.

LUCAS P. KYRIDES.
FERDINAND B. ZIENTY.

REFERENCES CITED

The following references are of record in the file of this patent:

UNITED STATES PATENTS

| Number | Name | Date |
| --- | --- | --- |
| 2,178,761 | Lazier | Nov. 7, 1939 |